| [19] | United States Patent | [11] | 4,026,783 |
|---|---|---|---|
| | Grot | [45] | May 31, 1977 |

[54] ELECTROLYSIS CELL USING CATION EXCHANGE MEMBRANES OF IMPROVED PERMSELECTIVITY

[75] Inventor: Walther Gustav Grot, Chadds Ford, Pa.

[73] Assignee: E. I. Du Pont de Nemours and Company, Wilmington, Del.

[22] Filed: Apr. 27, 1976

[21] Appl. No.: 680,872

Related U.S. Application Data

[62] Division of Ser. No. 425,079, Dec. 17, 1973, Pat. No. 3,969,285.

[52] U.S. Cl. .............................. 204/266; 204/296
[51] Int. Cl.² .................... C25C 13/08; C25C 9/00
[58] Field of Search .................. 204/252, 296, 266

[56] References Cited

UNITED STATES PATENTS 3,969,285   7/1976   Grot ............................. 260/2.2 R

*Primary Examiner*—R. L. Andrews

[57] ABSTRACT

Fluorinated cation exchange polymers are obtained from intermediate fluorinated polymers containing pendant sulfonyl halide groups which are reacted with a di- or poly-amine and subjected to elevated temperature of the order of 170° to 300° C. The polymers are desirably employed with pendant side groups in the salt form. The polymers possess permselectivity giving desirable performance in electrolytic cells such as chlor-alkali cells as well as membrane ion exchanger and reverse osmosis devices.

2 Claims, No Drawings

ELECTROLYSIS CELL USING CATION EXCHANGE MEMBRANES OF IMPROVED PERMSELECTIVITY

This is a division of application Ser. No. 425,079, filed Dec. 17, 1973, and now U.S. Pat. No. 3,969,285.

BACKGROUND OF THE INVENTION

Fluorinated ion exchange membranes are known in the art wherein the ion exchange polymer precursor contains pendant side chains in sulfonyl fluoride form. These groups are converted to ionic form such as by hydrolysis with an alkaline material or by treatment with ammonia. An example of such prior art teaching is disclosed in Connolly and Gresham U.S. Pat. No. 3,282,875.

Additionally, in the prior art is disclosed a technique of treating cation exchange polymers for modification of the property of relative cationic transport. This teaching is set forth in Mizutani et al. U.S. Pat. No. 3,647,086 in preparation of an ion exchange membrane wherein permeation selection of different classes of cations is improved. As set forth in this patent, a cation exchange polymer of a high molecular weight polymer contains chemically bonded acid amide groups. These groups are present at the substantial surface portion to satisfy the equation:

$$\frac{A}{A+B} \times 100 = 15 - 10^{-5} \%$$

wherein (per gram of dry membrane) A is the number of acid amide bonds and B is the number of cation exchange groups. The reaction is controlled such that the formation of the acid amide bonds takes place only at the surface or as set forth in the patent at the "substantial surface".

SUMMARY OF THE INVENTION

The precursor fluorinated polymers employed herein are of the type disclosed in Connolly et al., U.S. Pat. Nos. 3,282,875; Resnick, 3,560,568 and Grot, 3,718,627 with pendant sulfonyl groups present as $-SO_2F$ preferably or generically as $-SO_2X$ with X representing fluorine or chlorine.

In the present disclosure in the intermediate fluorinated polymer at least a portion of the pendant side chains which contain a sulfonyl halide group attached to a carbon atom having at least one fluorine atom connected thereto are reacted with a di- or poly-amine and subjected to an elevated temperature of at least 170° C. An upper temperature limit is when degradation of the polymer occurs and will be of the order of above 300° C. For optimum results the pendant groups in the polymer are converted to salt form either before or after heat treatment.

The ion exchange polymers such as in membrane form are highly desirable in comparison with prior art exchange polymers for several distinct reasons. The ion exchange sites formed initially by reaction with an amine polymer may be introduced into the polymer in membrane or film form in a relatively short period of time in comparison to introduction of sulfonamido groups in the prior art teachings. Most importantly, outstanding efficiencies in a chlor-alkali cell have been obtained in comparison to sulfonamido groups obtained by treatment with ammonia and other ion exchange groups obtained by hydrolysis of pendant sulfonyl groups. Furthermore, pronounced improvement in efficiencies have been obtained in comparison with the polymer which has not been heat treated, e.g., a polymer formed by reaction with an N-monosubstituted amine.

Conversion at the surface of the polymer of the pendant $-SO_2X$ groups with X as fluorine or chlorine takes place such that desirably at least the majority of the reactive sites are converted. However, it is within the scope of this disclosure to only convert by reaction with the amine a portion of the $-SO_2X$ groups. In the case of use of the polymer in ion exchange for a chlor-alkali cell most desirably essentially complete or complete conversion of the sulfonyl halide groups takes place on only a single surface of the film prior to heat treatment. Unreacted sulfonyl halide groups on a second film surface are hydrolyzed to convert them to ionic form. In an alternative manner sulfonyl halide groups on one surface may be hydrolyzed prior to conversion of the sulfonyl halide groups on the other surface of the film prior to reaction with the amine and heat treatment.

An important advantage of the present polymer and the method of preparation in comparison to treatment with ammonia of the prior art is elimination of extensive treatment times. A considerable time period for treatment is necessary for ammonia which ranges upwards from several hours while treatment with the amines will be of the order of minutes. The duration of heat treatment of the amine reacted polymer may be extremely brief, of the order of minutes or less, particularly at temperatures greatly in excess of 170° C. Flexibility is afforded with the amine reaction since the treatment techniques generally can involve liquid or gaseous contact. Also, with short periods of reaction a continuous process may be realized rather than batch conversion. Additionally, the heat treatment may be of brief duration, of the order of minutes or less, which allows employment of a continuous process.

An outstanding advantage has been obtained with ionic groups obtained by reaction of the pendant sulfonyl halide groups with an amine followed by heat treatment at a temperature of 170 to 300° C. in comparison with the ionic groups present as the sulfonamide obtained by reaction of the sulfonyl halide groups with ammonia. With a surface conversion by reaction with a di- or poly-amine, a substantial increase in current efficiency has been obtained such as in application in a chlor-alkali cell. Furthermore, the added heat treatment is critical since a pronounced increase has been obtained in current efficiency in comparison to a fluorinated ion exchange membrane with pendant sulfonyl halide groups reacted with a di- or poly-amine but which have not been subjected to elevated temperatures of the order of 170° C. and greater. This improvement is considered to be of predominant importance in commercial applicability in reducing the cost of producing a unit of chlorine and caustic.

Illustratively, in a chlor-alkali plant producing 1000 tons per day of chlorine, the direct savings in electrical power for only a 1% increase in efficiency are significant.

DETAILED DESCRIPTION

A need has developed in the chlor-alkali industry for the use of improved ion exchange materials which can replace existing separators which have been used for decades without substantial improvement in design.

In the environment of a chlor-alkali cell, the membrane must be able to withstand a hostile environment for a polymeric material such as exposure to a highly alkaline pH as well as exposure to chlorine. Generally, hydrocarbon ion exchange membranes are totally unsatisfactory for this usage since the polymer cannot withstand this environment.

For commercial usage in the chlor-alkali industry, a film must go beyond the ability to be operable for prolonged tine periods in the production of chlorine and caustic. A most important criteria is the current efficiency with the polymer in conversion of the brine in the electrolytic cell to the desired products. Therefore, improvement in current efficiency can translate into pronounced savings in the cost of production of each unit of chlorine and caustic. Additionally, from a commercial standpoint the cost of production of each unit will be determinative of the commercial suitability of an ion exchange membrane.

The ion exchange polymers of the present disclosure possess pendant side chains containing sulfonyl groups attached to carbon atoms having at least one fluorine atom connected thereto with the pendant chains formed by reaction of sulfonyl halide groups with a di- or poly-amine. The polymers are prepared from monomers which are fluorinated or fluorine substituted vinyl compounds. The polymers are made from at least two monomers with at least one of the monomers coming from each of the two groups described below. The first group is directed to fluorinated vinyl compounds such as vinyl fluoride, hexafluoropropylene, vinylidene fluoride, trifluoroethylene, chlorotrifluoroethylene, perfluoro(alkyl vinyl ether), tetrafluoroethylene and mixtures thereof. In the case of use of copolymers in electrolysis of brine, the precursor vinyl monomer desirably will not contain hydrogen.

The second group is directed to the sulfonyl-containing monomers containing the precursor —$SO_2F$ or —$SO_2Cl$. One example of such a comonomer is $CF_2=CFSO_2F$. Additional examples can be represented by the general formula $CF_2=CFR_fSO_2F$ wherein $R_f$ is a bifunctional perfluorinated radical comprising 2 to 8 carbon atoms. The particular chemical content or structure of the radical linking the sulfonyl group to the copolymer chain is not critical but such must have a fluorine atom attached to the carbon atoms to which is attached the sulfonyl groups. If the sulfonyl group is attached directly to the chain, the carbon in the chain to which it is attached must have a fluorine atom attached to it. Other atoms connected to this carbon can include fluorine, chlorine, or hydrogen although generally hydrogen will be excluded in use of the copolymer for ion exchange in a chlor-alkali cell. The $R_f$ radical of the formula above can be either branched or unbranched, i.e., straight-chained and can have one or more ether linkages. It is preferred that the vinyl radical in this group of sulfonyl fluoride containing comonomers be joined to the $R_f$ group through an ether linkage, i.e., that the comonomer be of the formula $CF_2=CFOR_fSO_2F$. Illustrative of such sulfonyl fluoride containing comonomers are $$CF_2=CFOCF_2CF_2SO_2F,$$
$$CF_2=CFOCF_2CFOCF_2CF_2SO_2F,$$
$$\qquad\qquad\qquad |$$
$$\qquad\qquad\qquad CF_3$$
$$CF_2=CFOCF_2CFOCF_2CFOCF_2CF_2SO_2F,$$
$$\qquad\qquad\quad | \qquad\quad |$$
$$\qquad\qquad\quad CF_3 \qquad CF_3$$

-continued- $CF_2=CFCF_2CF_2SO_2F$, and
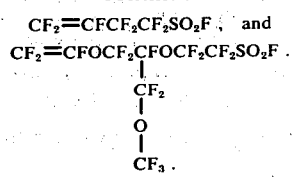

The most preferred sulfonyl fluoride containing comonomer is perfluoro(3,6-dioxa-4-methyl-7-octenesulfonyl fluoride),

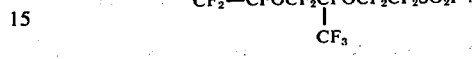

The sulfonyl-containing monomers are disclosed in such references as U.S. Pat. Nos. 3,282,875 to Connolly et al.; 3,041,317 to Gibbs et al.; and in 3,718,627 to Grot and in 3,560,568 to Resnick.

The preferred copolymers utilized in the film are perfluorocarbon although others can be utilized as long as there is a fluorine atom attached to the carbon atom which is attached to the sulfonyl group of the polymer. The most preferred copolymer is a copolymer of tetrafluoroethylene and perfluoro(3,6-dioxa-4-methyl-7-octensulfonyl fluoride) which comprises 10 to 60 percent, preferably, 25 to 50 percent by weight of the latter.

The copolymer used in the present invention is prepared by general polymerization techniques developed for homo- and copolymerizations of fluorinated ethylenes, particularly those employed for tetrafluoroethylene which are described in the literature. Nonaqueous techniques for preparing the copolymers of the present invention include that of U.S. Pat. No. 3,041,317, issued to H. H. Gibbs and R. N. Griffin on June 26, 1962, that is, by the polymerization of a mixture of the major monomer therein, such as tetrafluoroethylene, and a fluorinated ethylene containing sulfonyl fluoride in the presence of a free radical initiator, preferably a perfluorocarbon peroxide or azo compound, at a temperature in the range 0°–200° C. and at pressures in the range 1–200, or more atmospheres. The nonaqueous polymerization may, if desired, be carried out in the presence of a fluorinated solvent. Suitable fluorinated solvents are inert, liquid, perfluorinated hydrocarbons, such as perfluoromethylcyclohexane, perfluorodimethylcyclobutane, perfluorooctane, perfluorobenzene and the like.

Aqueous techniques for preparing the copolymer of this invention include contacting the monomers with an aqueous medium containing a free-radical initiator to obtain a slurry of polymer particles in non-water-wet or granular form, as disclosed in U.S. Pat. No. 2,393,967, issued to M. M. Brubaker on Feb. 5, 1946; or contacting the monomers with an aqueous medium containing both a free-radical initiator and a telogenically inactive dispersing agent, to obtain an aqueous colloidal dispersion of polymer particles, and coagulating the dispersion, as disclosed, for example, in U.S. Pat. No. 2,559,752, issued to K. L. Berry on July 10, 1951, and U.S. Pat. No. 2,593,583, issued to J. F. Lontz on Apr. 22, 1952.

Upon formation of the intermediate polymer, the pendant sulfonyl groups are present as —$SO_2X$ with X defining fluorine or chlorine and preferably fluorine. It is a requirement in both the intermediate and final fluorinated polymers disclosed herein that the sulfonyl groups are attached to carbon atoms having at least one fluorine atom connected thereto. These carbon atoms serve to link the sulfonyl group to the copolymer chain or alternatively, the carbon atoms form a portion of the backbone chain in the copolymer. After formation of the intermediate polymer, the sulfonyl groups are reacted with a di- or poly-amine with heat treatment of the converted polymer.

To obtain ion exchange properties from the polymer, it is necessary to introduce ion exchange sites. The sites are initially formed by reaction of the di- or poly-amine with the $-SO_2X$ containing polymer and are present after heat treatment. In many instances a difference in performance will be obtained dependent upon the amine employed, e.g., a variation in current efficiency with minimization of anion transport together with a variation in the power required for each unit of product from a chlor-alkali cell. Additionally, if the heat treated group or salt thereof is unstable in a specific environment, e.g., in use of a chlor-alkali cell, reaction and conversion of the group can occur to a stable ion exchange site.

As employed in the present context a di- or poly-amine is defined to denote an amine which contains at least two amino groups with one primary amino group and the second amino group either primary or secondary. Additional amino groups may be present so long as the above defined amino groups are present.

Specific amines falling within the above definition are included within the disclosure in Mizutani et al., U.S. Pat. No. 3,647,086 which disclosure of amines is incorporated by reference herein. This prior art patent sets forth reaction of both primary and secondary amines with ion exchange polymers. However, the reacted groups in the polymer under the operating conditions disclosed do not function as ion exchange groups or sites in direct contrast to the reacted groups in the polymer of the present application.

While the outstanding advantages have been obtained with essentially complete or complete conversion of the active sulfonyl halide ($-SO_2X$ form) in a polymer layer or surface, it is within the scope of this disclosure to undertake the reaction to convert a minimum of sulfonyl groups. A preferred minimum conversion will be a minimum of 40 to 50% or conversion or about a majority of the sulfonyl halide groups. As employed herein "essentially complete conversion" denotes reaction of the di- or poly-amine with at least 90% of the sulfonyl halide groups. "Complete conversion" denotes reaction of the di- or poly-amine with at least 99% of the sulfonyl halide groups. In the context herein conversion of the sulfonyl halide groups will be to a depth of a minimum of 1 micron and surface conversion includes reaction to this minimum thickness.

The polymer formed by reaction with the amine, either before or after heat treatment, possesses a high electrical resistance such as in a chlor-alkali cell. This disadvantage of high electrical resistance is overcome by formation of the salt of the amine which formation may take place either before or after heat treatment.

Both reactive and inert carriers and solvents for the amine may be employed. The reactive carrier will compete with the amine in conversion of the pendant sulfonyl halide sites on the precursor polymer. A reactive carrier contains active hydrogen such as water. Primary alcohols are not considered suitable since they react rapidly with the intermediate pendant sulfonyl halide groups lowering the concentration of the desired ion exchange sites. The competitive reaction may also produce ion exchange sites in the fluorinated polymer disclosed herein since the sulfonyl halide is converted to $-SO_3^-$.

Inert solvents may be desirably employed which contain no active hydrogen atoms and do not promote a competing reaction. Examples include dimethyl formamide, dimethyl sulfoxide, tetramethylene sulfone, hexamethyl phosphoramide, diglyme, acetonitrile and general classes of ethers and nitriles.

Pressure and temperature together with the carrier or solvent, if employed, will determine the efficiency and time of conversion of the sulfonyl groups and will tend to influence the degree of penetration of the amine into the polymer.

However, pressure and temperature are not considered critical in the framework of obtaining conversion of the pendant $-SO_2X$ groups but rather upon the rate of reaction and degree of penetration of the amine. Illustratively, room temperature conversion has been found to be satisfactory for most amines. Pressure, below at or above atmospheric pressure may be employed. With gaseous treatment, the proper combination of pressure and temperature will be employed to obtain the amine in the gaseous state. With gaseous treatment, an inert gas as a carrier may be employed. However, in the present disclosure it is critical to the final polymer that heat treatment takes place at a temperature between 170° C and the degradation temperature of the polymer.

For purposes of explanation in the reaction procedure, it is considered from physical observation after the initial reaction with the amine that a sharp line of demarcation exists between converted sulfonyl halide groups and unconverted sulfonyl halide groups of the intermediate polymer does not or is not allowed to completely react.

For the purposes of explanation only without being bound to any theory or mechanism of reaction, it is believed, that the treatment with di- and poly-amines converts the functional groups of the polymer predominantly to the following form:

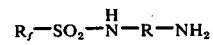

where $R_f$ represents the backbone polymer and R represents a bond between the nitrogen atoms or a linking group. This structure is amphoteric, that is it contains both a weakly acidic group (the $-NH-$ group linked to the sulfonyl group) and one or more weakly basic groups (the $NH_2$ groups). As a result, the resin can act as a cation or anion exchanger depending on the pH. In a moderately acidic medium (pH of less than 4), the basic group ionizes to form salts with anions. This is evidenced by the ability of the resin to be stained by the colored anion of an anionic dye. In this respect these functional groups are quite different from those derived from mono-amines.

In the strongly alkaline environment of a chloroalkali cell (pH of 13 or higher) however, the amino groups are unable to ionize. Instead, it is considered ionization occurs as the weakly acidic site with formation of the alkali metal salt:

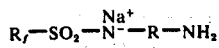

as evidenced by the fact that the membrane conducts electricity predominantly by the movement of cations. In the environment of chloro-alkali cell these functional groups therefore behave very similar to those derived from mono-amines. As a result, the current efficiencies obtainable with membranes modified by treatment with polyamines and mono-amines are very similar.

It is further believed, that during the heat treatment the unreacted amino groups are utilized to form cross-links. The exact nature of these cross-links is not known. To the extent, that the polymer before heat treatment contains unreacted sulfonyl fluoride groups, it is expected that the heat treatment results in the formation of

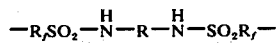

functional groups. In addition, reaction of the amino groups with fluorocarbon components of either the polymer backbone or side branches, with elimination of HF and formation of carbon-nitrogen bonds, may be possible. In either case, potential anion exchange sites are eliminated and cross-links are formed. At the same time, the acidity of existing cation exchange sites is increased and additional cation exchange sites may be formed.

The loss of anion exchange sites is evidenced by the loss of the ability to be stained by anionic dyes. The substantially increased current efficiency in chloro-alkali electrolysis may be explained by the fact that cross-linking would tend to decrease the swelling of the resin, thereby increasing the effective concentration of cation exchange sites and improving the Donnan exclusion of anions (OH ions).

From the above explanation it is considered that the staining obtained with separate cationic and anionic dye mixtures may serve as a screening technique to determine the anion and/or cation exchange sites in the polymer.

A suitable cationic dye mixture for the testing or screening procedure has been found to be 0.05 gm Sevron® Brillant Red 4 G and 5 gm sodium acetate dissolved in 100 ml water. A suitable anionic dye mixture is 0.05 gm Merpacyl® Blue and 1 gm sodium acetate dissolved in 100 ml water containing 25 ml acetic acid.

In the testing or screening procedure separate samples of the polymer to be tested are maintained for 30 minutes in either dye mixture heated to a temperature of 80° to 100° C. Polymer samples containing a substantial amount of cationic groups will be stained red by the cationic dye by a basic pH while polymer samples with a substantial amount of anionic groups will be stained blue by the anionic dye at an acidic pH. A polymer with a substantial amount of both these cationic and anionic groups will be stained by both colors.

Also, the staining technique is considered to serve as an indication of the depth of reaction of the di- or polyamine into a polymer surface. Measurement of the depth of the stained surface is considered to denote the depth of substantial reaction of the amine with the pendant sulfonyl halide groups.

The ion exchange polymer of the present disclosure in a chlor-alkali cell desirably may have a single surface reacted with the di- or poly-amine followed by heat treatment. In such event, the treated surface in the salt form faces the cathode portion of the cell producing caustic. This surface of the membrane serves to minimize anion transport of hydroxyl ions and acts as a barrier for such transport. Also, the formation of a surface layer, rather than total conversion, has been found to reduce the overall electrical resistance of the polymer film. Such surface conversions have led to a significant increase of the efficiency and a significant decrease in power consumption such as in comparison with sulfonyl groups converted with ammonia to the sulfonamide form. Current efficiencies approaching and exceeding 98% have been obtained in use of the fluorinated polymer modified by amine reaction followed by heat treatment. A comparison of a fluorinated polymer reacted with ethylene diamine followed by heat treatment as opposed to the fluorinated polymer reacted with ammonia has shown an increase of current efficiency of the order of 11–12% and greater. In comparison, reaction of the fluorinated polymer with ethylene diamine without heat treatment has shown an increase in current efficiency of the order of 6–7% in comparison to the fluorinated polymer reacted with ammonia.

An outstanding advantage has been found in terms of electrical efficiency in a chlor-alkali cell with the fluorinated polymers of the type disclosed herein with pendant groups formed by reaction of the di- or poly-amine followed by heat treatment of the reacted polymer. However, an equally important criteria in a chlor-alkali cell is the amount of power required for each unit of chlorine and caustic. It is considered the polymers of the type disclosed herein permit a proper combination of operating conditions to realize an excellent and unexpected reduction in power. Since the power requirement (which may be expressed in watt-hours) is a function of both cell voltage and current efficiency, low cell voltages are desirable and necessary. However, a polymer without a high current efficiency cannot operate effectively from a commercial standpoint even with extremely low cell voltages. Additionally, a polymer with an inherent high current efficiency allows a proper combination of parameters as in fabrication into the film and/or operation of the electrolytic cell to realize the potential theoretical reduction in power. Illustratively, the polymer can be fabricated at a lower equivalent weight which may result in some loss of current efficiency which is more than compensated by a reduction in voltage. Also, with higher current efficiencies, fewer impurities in the manufactured products may be obtained, e.g., less chloride present in production of caustic.

In use of the ion exchange polymer of the present disclosure, it has been found that a composite film or laminate is most desirable. The pendant sulfonyl groups on one surface of the film are reacted with the di- or poly-amine followed by heat treatment. The polymer is most desirably employed in salt form after heat treatment.

With a composite film or membrane the thickness of the amine reacted layer is not considered critical but normally will be at least 1200 angstroms in thickness. With a composite film or laminate, the thickness of the amine reacted layer will normally range from .01% to 80% of the film with 0.1 to 30% desirable with the use of the film or laminate in the chlor-alkali cell.

Additionally, in use of the composite film or membrane in the cell, the layer with the amine reacted layer or salt thereof will face the cathode portion of the cell in which caustic is produced. The results and stability of the membrane are drastically different with reversal of the film in a composite structure.

The use of ion exchange films in a chlor-alkali cell is known as disclosed in German patent application No. 2,251,660, published Apr. 26, 1973 and Netherlands patent application No. 72.17598, published June 29, 1973. In a similar fashion as these teachings, a conventional chlor-alkali cell may be employed with the critical distinction of the polymeric film in a housing separating the anode and cathode portions of the cell from which chlorine and caustic are respectively produced from brine flowing within the anode portion of the cell.

While the above description has been directed to use in a chlor-alkali cell, it is within the scope of this disclosure to produce alkali and alkali earth metal hydroxides and halogens such as chlorine from a solution of the alkali and alkali earth metal salt. While efficiencies in current and power consumption differ, the operating conditions of the cell are similar to those disclosed in the German and Netherlands publications.

It is within the scope of this disclosure that more than surface conversion of the polymer takes place with the di- or poly-amines. A high degree of penetration into the polymer may take place by the amine and essentially complete reaction by the amine with conversion of the pendant sulfonyl groups may take place. The amine treated polymer subject to high temperature treatment functions for ion exchange purposes with active ion exchange sites.

While about a majority of the pendant sulfonyl groups in $-SO_2F$ or $-SO_2Cl$ formed on a surface of a polymer may be converted, it is most desirable that essentially all of the pendant sulfonyl halide groups on a surface react with the di- or poly-amine. As previously set forth in the present context "essentially complete conversion" refers to reaction of at least 90% of the sulfonyl halide groups with the di- or poly-amine. Also, "complete conversion" refers to reaction of at least 99%, of the original pendant sulfonyl halide groups with the di- or poly-amine. Conversion will be a minimum thickness of 1 micron in the polymer.

As previously set forth, it is most desirable that the final polymer after heat treatment be employed with pendant groups in salt form. The conversion to salt form may be undertaken either before or after heat treatment. Before heat treatment, both acid and basic salts may be formed. However, it is the basic salt which is desirable for the final utility. Also, it is considered acid salts will not be present after heat treatment. Highly desirable basic salts include alkali and alkaline earth metals with sodium and potassium preferred. Formation of the salt may be undertaken by contact with a hydroxide of the alkaline or alkaline earth metal.

If salt conversion does not precede heat treatment, salt conversion is undertaken of the heat treated polymer. Basic salts may be formed in a similar manner as salt formation preceding heat treatment.

In the reaction with amine, extremely short reaction times are employed which are of the order of minutes such as 3 to 15 minutes to obtain an 0.5 mil thickness of conversion in the intermediate polymer. In contrast with the same type of intermediate polymer disclosed in Grot U.S. Pat. application Ser. No. 178,782 and now U.S. Pat. No. 3,784,399 a contact time as high as 24 hours is disclosed with a minimum contact time with liquid ammonia of less than 3 hours. This 3-hour treatment would obtain a conversion of about 0.5 mil of the polymer. Additionally, extremely low temperatures must be employed with liquid ammonia with the resulting disadvantage of complicated techniques.

After reaction of the sulfonyl halide with the di- or poly-amine, conversion to the salt form optionally is undertaken thereafter heat treatment of the polymer takes place. A temperature as low as 170° C may be employed with an uppermost limit being the temperature causing degradation of the polymer. While temperatures below 170° C. may cause some marginal improvement, the desirable results with short reaction times occur above the temperature of 170° C. The reaction time employed will be dependent on the temperature. Lower temperatures will denote longer reaction times. Illustratively, a temperature of 170° C. will require a temperature of 1 or more hours while a temperature of 280° C. will denote a reaction time of the order of 1 minute. As a practical matter for relatively short heat treatments, a temperature above 190° C. will be used.

For the purposes of explanation, crosslinking of the reacted di- or poly-amine is considered to take place. This theory of cross-linking in the polymer is considered to account for the difference in results as in permselectivity measurements and a difference in current efficiency in operation as a membrane in a chlor-alkali cell.

Additionally, an intermediate fluorinated polymer with pendant sulfonyl halide groups will undertake reaction with a primary amine such as methyl amine to form ion exchange groups. However, heat treatment of the polymer does not result in the change of permselectivity or the change in current efficiency in operation of a chlor-alkali cell.

In accordance with the disclosure of the present invention the fluorinated polymer will possess ion exchange capacity after reaction of the pendant sulfonyl halide groups with the di- or poly-amine. However, it is the added step of heat treatment which is considered most desirable from the standpoint of use of the polymer. As previously discussed, an improvement in results has been obtained by the heat treated polymer such as electrical efficiency in use in a chlor-alkali cell.

With only surface conversion of the sulfonyl halide groups, further conversion of the remaining sulfonyl halide groups to the ionic form is most desirable. The prior art techniques of conversion of the $-SO_2X$ groups with X as defined may be undertaken such as by hydrolysis. The techniques set forth in Connolly & Gresham U.S. Pat. No. 3,282,875 and/or Grot U.S. Ser. No. 178,782 and now U.S. Pat. No. 3,784,399 may be employed. Illustratively, the unconverted sulfonyl groups of the polymer may be converted to the form $-(SO_2NH)_mQ$ wherein Q is H, $NH_4$, cation of an alkali metal and/or cation of an alkaline earth metal and m is the valence of Q. Additionally, the unconverted sulfonyl groups may be formed to $-(SO_3)_nMe$ wherein Me is a cation and n is the valence of the cation. Preferred definitions of Q include $NH_4$ and/or cation of an alkaline metal particularly sodium or potassium. Preferred definitions of Me include potassium, sodium and hydrogen.

The polymer is preferably employed in the form of a film and desirably thicknesses of the order of 0.0002 to 0.02 inch may be utilized. Excessive film thicknesses will aid in obtaining higher strength with the resulting deficiency of increased electrical resistance.

It is known in the prior art as U.S. Pat. No. 3,647,086 issued to Mizutani et al. to treat a membrane with an amine to impart acid amide groups. However, the disclosed cation exchange membranes do not have ability to withstand the environment of a chlor-alkali cell for any appreciable time period and are totally unacceptable for this use. This patent discloses the acid amide groups are to be present at the substantial surface in a concentration based on the formula $$\frac{A}{A+B} \times 100 = 15 - 10^{-5}\%$$

wherein, (per gram of dry membranes) A is the number of acid amide bonds/gram of dried membrane and B is the number of cation exchange groups, said acid amide bonds being composed of a cation exchange group and an amine having amino group containing at least one hydrogen atom bonded to a nitrogen atom.

In the use of cation exchange membranes of this U.S. Pat. No. 3,647,086, an object is to provide an ion exchange membrane which effects permeation selection of different classes of cations and most particularly, cations with small valences.

From the disclosure of the patent, it is apparent that functioning is not contemplated of the acid amide group as an ion exchange site. For example, for the acid amide group to function as an ion exchange site, a basic and preferably highly basic ph is necessary. Permeation selection of different classes of cation is solely contemplated. A low degree of reaction by the amine with the base polymer is set forth and use of the membrane solely at high pH is not disclosed. The property of ion exchange is a function of the pK value which is an indication of acidity and is the negative logarith of the dissociation constant of the nitrogen-hydrogen bond.

In direct contrast to the disclosure of Mizutani et al., U.S. Pat. No. 3,647,086, the amine reacted and heated treated group or salts thereof are required to function as ion exchange sites in the fluorinated polymer. This ion exchange function allows high conversion rates of the sulfonyl halide groups which can be of the order of 100%. This difference in ion exchange properties as opposed to nonion exchange prior to heat treatment is true of the same pendant groups on different types of polymers. Also, U.S. Pat. No. 3,647,087 discloses reaction of secondary amines which cannot yield acid amides that function as ion exchange groups at any pH. Thus, it may be summarized that the purpose of Mizutani et al. U.S. Pat. No. 3,647,086 is not to obtain an ion exchange site by reaction with an amine while in the present disclosure it is absolutely essential.

As previously discussed, utility for the heat treated fluorinated polymer and salts thereof is for ion exchange. Therefore, general utility of the polymer for ion exchange is directly contemplated. Illustratively, permeation selection of cations is directly encompassed. One method of determination of cation exchange properties is a measurement of permselectivity with separation of the same cations in solutions but at different concentrations. This involves cation transport and a permselectivity measurement of no voltage would indicate the polymer does not function for ion exchange. The membranes possess permselectivity giving utility in electrolytic cells as for example, in electrolytic cells particularly chlor-alkali cells as well as membrane ion exchange and reverse osmosis devices.

To further illustrate the innovative aspects of the present invention, the following examples are provided.

EXAMPLE 1

In this and the following examples a film is employed of a copolymer of tetrafluoroethylene and

and is referred to as precursor polymer containing pendant sulfonyl fluoride groups. The equivalent weight of the polymer is given and illustratively at a mole ratio of tetrafluoroethylene to the other monomer of 7:1, an equivalent weight of 1146 would be obtained. Equivalent weight is the weight of the polymer in grams containing one equivalent of potential ion exchange capacity.

A 7 mil film of precursor fluorinated polymer containing pendant sulfonyl fluoride groups (EW = 1100) was folded to a bag and heat sealed around the edge except for a small area to permit the insertion of a funnel. Ethylene diamine (99% purity) was poured into the bag through this funnel and moved around inside the bag to assure contact with the entire inner surface of the bag. After 5 minutes the ethylene diamine was emptied and the inside of the bag rinsed with dilute acetic acid and 5 times with water. The bag was then cut open and permitted to dry.

The treated film was then laminated on the untreated (outside) surface with a T-12 "Teflon" fabric made by Stern % Stern Textiles, Inc., Hornell, N.Y. The lamination involved the application of vacuum to the other side of the fabric for 1 minute at a temperature of approximately 280° C. The remaining pendant sulfonyl fluoride groups were converted to —SO$_3$K groups by immersing the laminate in a solution of 15% potassium hydroxide and 30% dimethyl sulfoxide in water for 6 hours at 60° C.

The laminate was clamped in a chlor-alkali cell with the amine treated side toward the cathode. The chlor-alkali electrolysis cell was construed of two identical half cell housings made from Teflon® TFE resin into which were mounted in the respective cell housings a dimensionally stable anode and a perforated stainless steel cathode. The clamped film gave an active area of the electrodes and membrane of 4 × 4 inches. The electrolytes, saturated brine and sodium hydroxide, were circulated through respective cell halves with a temperature maintained at 85° C. by heaters installed in the circulatory lines. Fresh brine was pumped into the anode section of the cell and distilled water was pumped into the cathode section of the cell.

In operation of the cell a current efficiency of 96% was realized at a cell voltage of 4.7 volts. A sodium hydroxide concentration of 17% was obtained.

EXAMPLE 2

A similar precursor polymer film was treated with ethylene diamine for 15 minutes as described in Example 1. After the treatment, the film was washed twice with dioxane, once with 1% sodium hydroxide solution and 5 times with water. After drying the film was heated for 1 hour to 180° C. followed by 10 minutes to 220° C.

When tested in a chlor-alkali cell as described in Example 1 a current efficiency of 98% at a cell voltage of 3.9 volts was realized. A sodium hydroxide concentration of 16% was obtained.

EXAMPLE 3

A 5 mil film of precursor fluorinated polymer containing pendant sulfonyl fluoride groups (EW = 1108) was placed as a liner in a Pyrex® baking dish. Ethylene diamine (99% purity) was poured on top of the film so as to contact only the top surface. The surface of the liquid was covered with a second, similar film to minimize the exposure to moisture. After 15 minutes at room temperature, the amine was poured off, the film rinsed first with diglyme, then benzene and finally with warm water at about 40° C. Staining of a cross section of the film with Sevron Red in a sodium bicarbonate buffered solution indicated reaction to a depth of 0.7 mil.

The remaining pendant sulfonyl fluoride groups were converted to —$SO_3K$ groups by immersing the film in a solution of 15% potassium hydroxide and 30% dimethyl sulfoxide in water for 6 hours at 60° C. No high temperature heat treatment was employed.

The film was clamped in the chlor-alkali cell of Example 1 with the amine treated side toward the cathode and the same procedure as Example 1 was followed.

In operation of the cell a current efficiency of 91% was obtained at a cell voltage of 3.6 volts. The sodium hydroide concentration was 14%.

EXAMPLES 4 to 6

Three separate pieces of 7 mil film of precursor fluorinated polymer containing pendant sulfonyl fluoride groups (EW= 1100) were placed as liners into petri dishes and each of the following polyamines were poured on respective samples so as to contact only the top surfaces:
A. 1,2 diamino propane
B. 1,6 diamino hexane (as a 50% solution in dimethyl sulfoxide)
C. diethylene triamine The dishes were covered to minimize exposure to moisture and carbon dioxide. After 20 minutes the amines were poured off and the film washed with dimethyl sulfoxide. The films were divided into four separate samples. One sample was contacted with a cationic dye prepared by dissolving 0.05 gm Sevron® Brilliant Red 4 G and 5 gm sodium acetate in 100 ml water. Another sample was contacted with an anionic dye prepared by dissolving 0.05 gm Merpacyl® Blue and 1 gm sodium acetate in 100 ml water containing 25 ml acetic acid. The samples were heated in the respective dye mixtures at a temperature of 90° C. for 30 minutes. The samples were dyed weakly red by the cationic dye and blue by the anionic dye.

The two remaining undyed samples of each film which had been previously treated with the amine were heated to 200° C. for 1 hour. One sample of each film was heated in the cationic dye at 90° C. for thirty minutes, while the other sample was heated in the anionic dye under the same conditions. The samples contacted with the cationic dye were stained red to a stronger degree in comparison to the samples not heated to 200° C. No staining took place of the samples contacted with the anionic dye Although the invention has been described by way of specific embodiments, it is not intended to be limited thereto. As will be apparent to those skilled in the art, numerous embodiments can be made without departing from the spirit of the invention or the scope of the following claims.

What is claimed is:

1. An electrolytic cell comprising a housing with anode and cathode sections, said sections separated by a film of fluorinated ion exchange polymer comprising
   a. a first surface formed from an intermediate fluorinated polymer containing pendant sulfonyl halide groups attached to carbon atoms which have at least one fluorine atom connected thereto in which
      i. at least 40% of the sulfonyl halide groups to a depth of at least one micron in the intermediate polymer have been reacted with a di- or polyamine comprising at least two groups with one primary amine group and a second amino group either primary or secondary, said first surface facing the cathode section; and
      ii. the polymer of (i) has been subjected to an elevated temperature of between 170° C. and the degradation temperature of the reacted polymer for a period of time to increase permselectivity;
   b. a second surface containing pendant sulfonyl groups attached to carbon atoms which have at least one fluorine atom connected thereto with at least a majority of the sulfonyl groups present as —$(SO_2NH)_mQ$, or —$(SO_3)_nMe$ wherein Q is selected from the group consisting of H, $NH_4$, cation of an alkali metal, cation of an alkaline earth metal and combinations thereof, m is the valence of Q, Me is a cation and n the valence of the cation.

2. The cell of claim 1 wherein said film is formed from an intermediate polymer which is a copolymer of tetrafluoroethylene and perfluoro(3,6-dioxa-4-methyl-7-octenesulfonyl fluoride).

* * * * *